Jan. 1, 1935.  E. A. RASBRIDGE  1,986,358

CHECK VALVE

Filed April 28, 1933

Inventor
E. A. Rasbridge
By his Attorney
W. E. Beck, Jr.

Patented Jan. 1, 1935

1,986,358

UNITED STATES PATENT OFFICE 1,986,358

CHECK VALVE

Edward A. Rasbridge, Lebanon, Pa.

Application April 28, 1933, Serial No. 668,429

1 Claim. (Cl. 251—127)

The present invention relates to improvements in check valves of a type used in apparatus for dispensing beer and like charged liquids, the valve being designed for attaching to a keg or vessel containing the liquid and to an air pump or compressed air supply by means of which compressed air can be forced into the vessel as the liquid is drawn therefrom.

Primarily the invention constitutes an improvement in the valve covered by Letters Patent 1,000,121, the principal object of the present invention residing in the construction of a check valve of relatively light weight to faciliate the closing action thereof when the pressure of air fed into the keg has been decreased and further to provide a check valve capable of more quickly responding to pressure contained in the keg to insure prompt closing thereof.

Another object is to provide a valve arranged for movement upwardly during its closing action and formed of material possessing a lower specific gravity proportionately than the remaining parts of the valve assembly.

Figure 1:
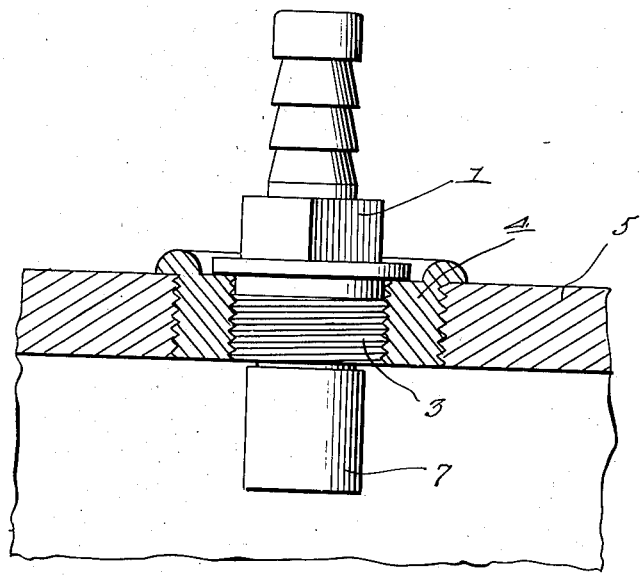
Figure 2:
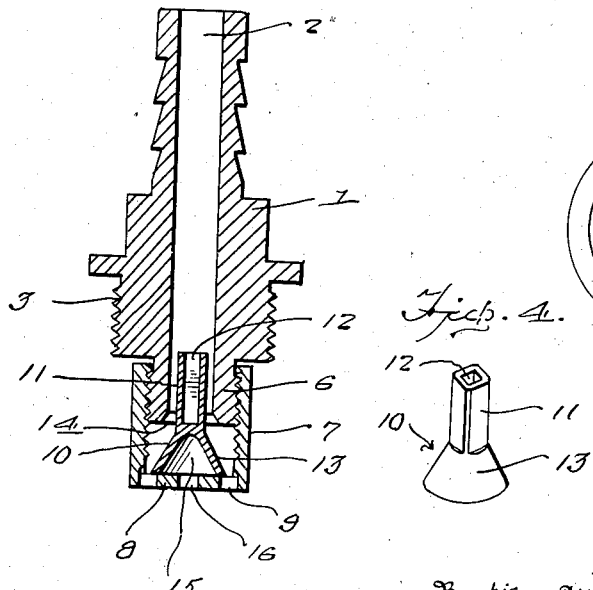
Figure 3:
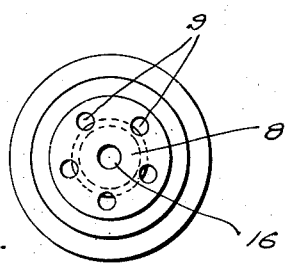
Figure 4:
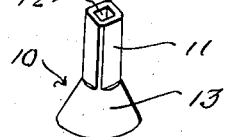

Other objects and advantages will become apparent from the following detailed description when viewed together with the accompanying drawing forming part hereof, wherein like numerals refer to like parts throughout and in which Figure 1 is a fragmentary sectional view of a keg showing the valve assembly applied thereto, Figure 2 is a longitudinal sectional view through the valve assembly, Figure 3 is a bottom plan view, and Figure 4 is a perspective view of the valve.

Referring now to the drawing in detail, the numeral 1 designates the valve body having a central bore 2 formed therein and with one end threaded as shown at 3 for attaching to the bung 4 of a keg 5 or other container. The opposite end of the body is preferably annularly grooved for attaching an air hose (not shown) for connecting to a suitable supply of air under pressure in order that pressure may be supplied to the liquid within the keg. The inner end of the valve body is formed with an externally threaded reduced extension 6 for attaching a cap 7 thereto, the bottom 8 of the cap being perforated as shown at 9 to permit the free passage of air therethrough. The bottom of the cap 8 is spaced from the end of the body to permit limited movement of a check valve 10 therein, said valve embodying a stem 11, preferably square-shaped in cross section, and of hollow construction substantially throughout its length as shown at 12. The stem is inserted in the lower end of the bore 2 of the body, the bore 2 being of sufficient diameter to permit free reciprocating movement of the stem therein, as clearly shown in Figure 2 of the drawing.

The outer end of the valve is formed with a conical head 13 for seating upon the valve seat 14 formed in the end of the extension 6 of the body.

The head 13 is concaved or recessed as shown at 15, the recess or cupped out portion extending substantially throughout the depth of the head.

It will become apparent from the foregoing that the hollow stem 11 and recessed or cupped out head 13 materially reduce the weight of the valve and by reason of this reduced weight considerably less pressure will be required to move the valve upward into its closed position than is necessary for valves of a solid construction.

In constructing the cap 7 a central perforation 16 is provided which allows direct communication of pressure within the keg to the recess or cupped portion 15 of the valve, this central perforation preventing the formation of a vacuum within the recess 15 by reason of the resting of the valve on the bottom of the cap and subjects the entire capped or recessed area to the internal pressure of the keg to insure a quick closing action.

I claim:

A check valve of the class described comprising in combination a body having a bore extending therethrough, a valve seat at the lower end of the bore, a cap threadedly attached to the lower end of the body and having a perforated base, and a valve within the cap having an integrally formed hollow stem and head closed at their junction to prevent communication through the valve, said stem being non-circular in cross section and inserted upwardly within the lower end of the bore of the body in a manner to reduce tilting of the valve to a minimum, said head being conical and cooperating with the valve seat to close communication through the bore by fluid pressure exerted upon the head and said head further being of less diameter than the cap with its edge spaced substantially below the lower end of the body whereby to allow circulation of the fluid pressure about the head when in closed position for equalizing said pressure at the interior and exterior surfaces of the head.

EDWARD A. RASBRIDGE.